Feb. 24, 1953 A. J. CHECK 2,629,345
SCRAPING DEVICE FOR ROLLING PINS
Filed June 29, 1950
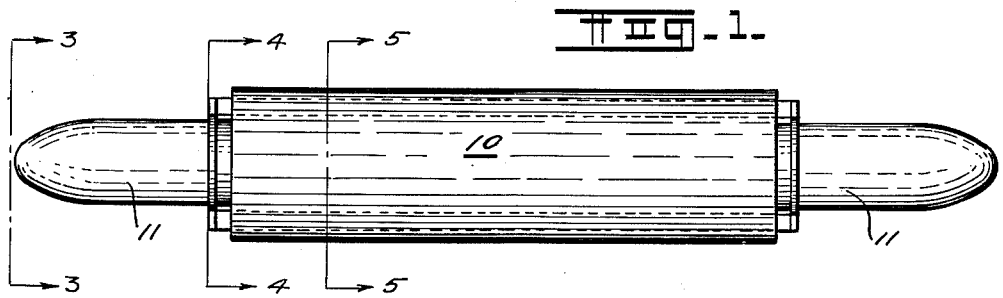
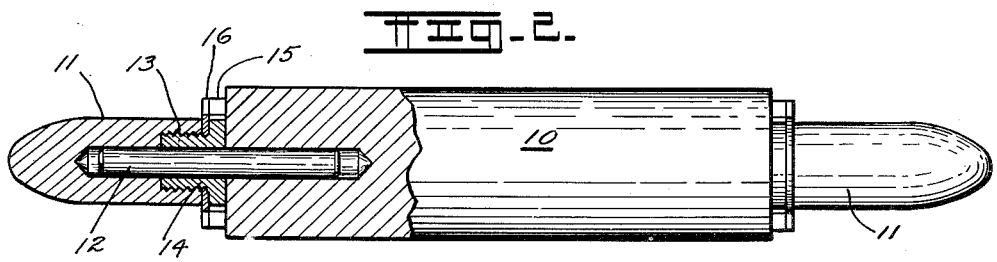
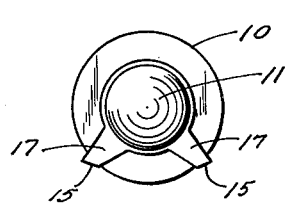 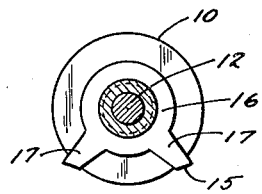 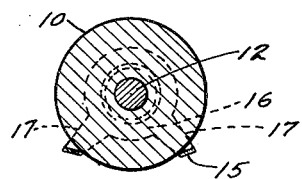
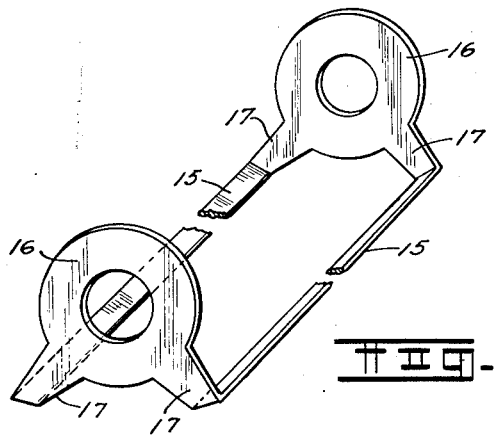
INVENTOR.
Alex J. Check.
BY
W. B. Harpman
ATTORNEY.

Patented Feb. 24, 1953

2,629,345

UNITED STATES PATENT OFFICE 2,629,345

SCRAPING DEVICE FOR ROLLING PINS

Alex J. Check, Canfield, Ohio

Application June 29, 1950, Serial No. 171,163

1 Claim. (Cl. 107—50)

This invention relates generaly to rolling pins and more particularly to a scraping device for a rolling pin to remove dough adhering to the rolling pin.

The principal object of the invention is the provision of a scraping device for application to a rolling pin.

A further object of the invention is the provision of a simple and inexpensive scraping device for continually cleaning the surface of a rolling pin.

A still further object of the invention is the provision of a scraping device for a rolling pin and formed as a stamping from a single piece of metal.

A still further object of the invention is the provision of a scraping device for a rolling pin which may be secured to the handles of the rolling pin and thereby manually positioned with respect to the rolling pin.

The scraping device for a rolling pin as disclosed herein comprises a simple and inexpensive attachment for a rolling pin which may be attached to old rolling pins or formed on new rolling pins. The rolling pin scraping device comprises a pair of longitudinally extending scraping blades secured at their opposite ends to supporting elements which are in turn positioned on the pivotal mounting of the handles of the rolling pin so that the scraping blades lie closely alongside the rolling pin itself and are effective in scraping loose dough, flour, etc., as may adhere to the surface of the rolling pin when it is used.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

Figure 1 is a top plan view of a rolling pin with the scraping device attached thereto.

Figure 2 is a top plan view of the rolling pin and scraping device with parts broken away and parts in cross section.

Figure 3 is an end view taken on line 3—3 of Figure 1.

Figure 4 is a vertical section taken on line 4—4 of Figure 1.

Figure 5 is a vertical section taken on line 5—5 of Figure 1.

Figure 6 is a perspective view of the scraper for rolling pins with parts broken away.

By referring to the drawings and Figures 1 and 3 in particular it will be seen that a rolling pin has been disclosed, the main body of which is indicated by the numeral 10 and the same is provided with rotatably mounted handles 11—11 on the opposite ends thereof. The handles 11—11 are rotatably mounted on the pin 10 by means of pivot pins 12 which are positioned partially within the pin 10 and partially within the handle 11. The innermost ends of the handles 11—11 are preferably drilled and tapped as at 13 to receive a plug 14. The plugs 14 have a centrally located opening so that it may be positioned over the pin 12.

A scraper device including longitudinally extending blades 15—15 and end blades 16—16 is mounted on the rolling pin, as best shown in Figures 1, 2, 3 and 4 of the drawings, with the end blades 16—16 lying between the innermost ends of the handles 11 and the outermost plugs 14. Such positioning of the scraper device enables it to be secured to the handles 11 or allowed to rotate freely with respect thereto, as desired.

The scraper device is shown in perspective view in Figure 6 of the drawings and by referring thereto it will be noted that it can be formed as a single stamping or suitable metal or, alternately, it may be formed of several pieces assembled or molded of plastic if desired. It includes the longitudinally extending parallel scraping blades 15—15 which are secured at their opposite ends to the blades 16 by means of radially spaced arms 17—17 thereon. The radially spaced arms 17—17 enable the proper positioning of the scraper blades 15—15 with respect to one another and immediately adjacent the surface of the rolling pin 10. It will thus be seen that when the rolling pin is used, the scraper blades 15—15 will engage the pin 10 and remove dough, flour and the like adhering thereto at a point close to its point of pickup thereby enabling dough to be rolled with the rolling pin without tearing or otherwise altering the surface of the dough. It will thus be seen that while the device is preferably affixed to the handles 11—11 so that its positioning may be controlled by the user of the rolling pin, it will operate effectively if it is allowed to pivot on the handles or as in either event, the blades are in engagement with the rolling pin 10 and operable for their intended purpose.

It will thus be seen that the objects of the invention have been met by the scraping device for rolling pins disclosed herein.

Having thus described my invention, what I claim is:

A rolling pin and a scraping device therefor, the said rolling pin having pins projecting from the ends thereof on the axis thereof, handles pivotally mounted on said projecting pins, apertured end plates positioned on said projecting pins between said handles and said rolling pin, and a pair of spaced parallel divergent scraping blades secured at their ends to the said apertured plates and lying against the peripheral surface of the rolling pin.

ALEX J. CHECK.

REFERENCES CITED

The following references are of record in the file of this patent:

UNITED STATES PATENTS

| Number | Name | Date |
| --- | --- | --- |
| 126,833 | Rippon | May 14, 1872 |
| 807,075 | Harloe | Dec. 12, 1905 |
| 855,042 | Cattlin | May 28, 1907 |